(12) United States Patent
Torii et al.

(10) Patent No.: US 8,410,673 B2
(45) Date of Patent: Apr. 2, 2013

(54) SPARK PLUG HAVING A GROUND ELECTRODE OF SPECIFIC ALLOY COMPOSITION TO WHICH A NOBLE METAL TIP IS JOINED

(75) Inventors: Kazuyoshi Torii, Aichi (JP); Tomoo Tanaka, Kitanagoya (JP); Akira Suzuki, Nagoya (JP); Mamoru Musasa, Nagoya (JP); Naomichi Miyashita, Kasugai (JP); Osamu Yoshimoto, Inazawa (JP)

(73) Assignee: NGK Spark Plug Co., Ltd., Aichi (JP)

( * ) Notice: Subject to any disclaimer, the term of this patent is extended or adjusted under 35 U.S.C. 154(b) by 13 days.

(21) Appl. No.: 13/062,571

(22) PCT Filed: Sep. 9, 2009

(86) PCT No.: PCT/JP2009/065755
§ 371 (c)(1),
(2), (4) Date: Mar. 7, 2011

(87) PCT Pub. No.: WO2010/029944
PCT Pub. Date: Mar. 18, 2010

(65) Prior Publication Data
US 2011/0163653 A1 Jul. 7, 2011

(30) Foreign Application Priority Data
Sep. 9, 2008 (JP) .................................. 2008-230540

(51) Int. Cl.
*H01T 13/28* (2006.01)
(52) U.S. Cl. ........................................ 313/141; 313/118

(58) Field of Classification Search .................. 313/118, 313/140, 141, 143; 445/7
See application file for complete search history.

(56) References Cited

U.S. PATENT DOCUMENTS

| | | | |
|---|---|---|---|
| 6,215,235 B1 | 4/2001 | Osamura | |
| 6,304,022 B1 | 10/2001 | Matsutani | |
| 6,759,795 B2 | 7/2004 | Kumagai et al. | |
| 2002/0038992 A1 | 4/2002 | Morita et al. | |
| 2002/0105254 A1 | 8/2002 | Hori et al. | |
| 2002/0130602 A1 | 9/2002 | Kanao et al. | |
| 2003/0178925 A1 | 9/2003 | Kumagai et al. | |
| 2004/0061421 A1 | 4/2004 | Morita et al. | |
| 2006/0276097 A1 | 12/2006 | Suzuki et al. | |
| 2007/0159046 A1 | 7/2007 | Yoshimoto et al. | |

FOREIGN PATENT DOCUMENTS

| | | |
|---|---|---|
| JP | 60-133685 A | 7/1985 |
| JP | 11-111426 A | 4/1999 |
| JP | 11-204233 A | 7/1999 |

(Continued)

*Primary Examiner* — Joseph L Williams
(74) *Attorney, Agent, or Firm* — Sughrue Mion, PLLC

(57) ABSTRACT

A spark plug having a center electrode and a ground electrode including a ground electrode main body part having an end thereof facing the center electrode and a noble metal tip joined to the ground electrode main body part at a position facing a leading end of the center electrode, a spark discharge gap being formed between the leading end of the center electrode and the noble metal tip, wherein at least a portion of the ground electrode main body part, to which the noble metal tip is joined, is made of an Ni alloy containing 12 to 45 mass % of Cr, 7 mass % or less of Fe, 0.5 to 5 mass % of Al, 0.3 to 5 mass % of Si and 50 mass % or more of the balance, and wherein the joined portion and the noble metal tip are joined by laser welding or electron beam welding.

13 Claims, 2 Drawing Sheets

FOREIGN PATENT DOCUMENTS

| | | |
|---|---|---|
| JP | 11-233233 A | 8/1999 |
| JP | 2002-184551 A | 6/2002 |
| JP | 2002-237365 A | 8/2002 |
| JP | 2003-105467 A | 4/2003 |
| JP | 2003-197347 A | 7/2003 |
| JP | 2003-323962 A | 11/2003 |
| JP | 2004-247112 A | 9/2004 |
| JP | 2005-158322 A | 6/2005 |
| JP | 2007-165291 A | 6/2007 |
| JP | 2007173116 A | 7/2007 |

SPARK PLUG HAVING A GROUND ELECTRODE OF SPECIFIC ALLOY COMPOSITION TO WHICH A NOBLE METAL TIP IS JOINED

TECHNICAL FIELD

The present invention relates to a spark plug, and more particularly, to a spark plug having a ground electrode provided with a noble metal tip as a spark discharge member.

BACKGROUND ART

In general, a spark plug that is used in an internal combustion engine comprises a center electrode that is fitted in a cylindrical metal shell via an insulator and a ground electrode having one end that is joined to the metal shell and the other end that faces a leading end of the center electrode. In addition, in order to improve the ignitability, a spark plug is also used which has a ground electrode having a noble metal tip that is convexly provided, while facing a leading end of a center electrode, to a ground electrode main body part extending to the leading end of the center electrode from a metal shell (for example, refer to Patent Document 1).

[Patent Document]
[Patent Document 1] Japanese Unexamined Patent Publication No. 2002-237365

DISCLOSURE OF THE INVENTION

Problem to be Solved

In a spark plug having a ground electrode to which a noble metal tip is joined by laser welding, as metal constituting a ground electrode main body part, Ni alloy having Ni as a main component is very suitable because of its excellent corrosion resistance. For example, Ni alloy such as Inconel™ 600 or Inconel™ 601 is used. However, since the ground electrode is most protrudingly attached into a combustion chamber, the temperature thereof reaches around 1000° C., in some cases above 1000° C. Thus, when the ground electrode is used for a long time, a melted portion, at which a joined portion of the ground electrode main body part and the noble metal tip are melted each other, is heat-deteriorated, so that a part of a circumferential surface of the melted portion may be thinned (hereinafter, referred to as "hollow"). In addition, the ground electrode is exposed to high temperatures for a long time, so that the ground electrode main body part may be oxidized. In some cases, the noble metal tip may be detached.

Accordingly, regarding a spark plug having a ground electrode to which a noble metal tip is joined by laser welding, an object of the invention is to suppress the hollow of a melted portion, in which a joined portion of a ground electrode main body part and the noble metal tip are melted, and to improve resistance to oxidization at high temperatures of the ground electrode main body part, thereby preventing the noble metal tip from being detached.

Means for Solving the Problems

The inventors analyzed the melted portion in which the joined portion of the ground electrode main body part and the noble metal tip are melted and found that iron oxide is highly responsible for the hollow, Ni alloy constituting the ground electrode main body part contains Fe and Fe is melted into the melted portion. In addition, the inventors found that contents of Al and Si contribute to improve the resistance to oxidization at high temperatures of the ground electrode main body part. Further, the inventors found that it is effective to decrease the content of Fe and to include specific amounts of Al and Si. The invention is based on the above knowledge.

In other words, the invention provides following spark plugs.

(1) A spark plug comprising:
a cylindrical metal shell;
a cylindrical insulator held by the metal shell;
a center electrode held in the insulator; and
a ground electrode that includes a ground electrode main body part having one end fixedly connected to the metal shell and the other end facing the center electrode, and a noble metal tip joined to the ground electrode main body part at a position facing a leading end of the center electrode, a spark discharge gap being formed between the leading end of the center electrode and the noble metal tip, wherein at least a portion of the ground electrode main body part, to which the noble metal tip is joined, is made of an alloy containing 12 to 45 mass % of Cr, 7 mass % or less of Fe, more than 0.5 mass % to 5 mass % or less of Al, more than 0.3 to 5 mass % or less of Si and Ni with 50 mass % or more of the rest of the contents, and wherein the joined portion and the noble metal tip are joined by laser welding or electron beam welding.

(2) The spark plug according to (1), wherein the content of Al is 0.7 mass % or more and the content of Si is 0.7 mass % or more.

(3) The spark plug according to (1) or (2), wherein the alloy constituting the joined portion includes at least one of Y, Hf, Zr, La, Ce and Nd by 0.01 to 0.4 mass %.

(4) The spark plug according to one of (1) to (3), wherein the alloy constituting the joined portion includes 0.005 to 5 mass % of Mn.

(5) The spark plug according to one of (1) to (4), wherein the noble metal tip is made of Pt alloy.

(6) The spark plug according to (5), wherein the Pt alloy includes at least one of Ir, Rh, Ru and Ni.

(7) The spark plug according to (5) or (6), wherein a melted portion in which the joined portion and the noble metal tip are melted each other includes 3 mass % or less of Fe, 10 to 60 mass % of Ni, 15 to 75 mass % of Pt, 4 to 35 mass % of Cr, 0.03 to 2 mass % of Al and 0.03 to 2 mass % of Si.

(8) The spark plug according to (7), wherein the melted portion includes 0.1 mass % or more of Al and 0.1 mass % or more of Si.

(9) The spark plug according to (7) or (8), wherein the melted portion includes at least one of Y, Hf, Zr, La, Ce and Nd by 0.001 to 0.2 mass %.

(10) The spark plug according to one of (7) to (9), wherein the melted portion includes 0.0025 to 3 mass % of Mn.

(11) The spark plug according to one of (1) to (10), wherein where a longitudinal length of the ground electrode main body part from the joined end of the ground electrode main body part with the metal shell to the joined position of the noble metal tip is L and a cross sectional area of the ground electrode main body part perpendicular to the longitudinal direction is S, a relation of $29 \leq L^2/S \leq 49$ is satisfied and a thermal conductivity of the ground electrode main body part is 18 W/(m·K) or less at room temperatures.

(12) The spark plug according to (11), wherein 10% or more of the cross sectional area (S) of the ground electrode main body part is made of Cu or Cu alloy and a relation of $35 \leq L^2/S \leq 70$ is satisfied within a range of ½ or more of the longitudinal length (L) of the ground electrode main body part.

(13) The spark plug according to one of (1) to (12), wherein the ground electrode main body part has a pedestal part that is fixedly connected to a surface thereof at the position facing the leading end of the center electrode, the pedestal part is made of the alloy and the noble metal tip is joined to the pedestal part by the laser welding or electron beam welding.

Effects of the Invention

According to the spark plug of the invention, the ignitability is excellent since the noble metal tip is provided to the ground electrode. In addition, since the Fe content of the Ni alloy constituting the joined portion of the ground electrode main body part is equal to or less than a predetermined value, it is possible to suppress iron oxide from being generated, which causes the hollow at the melted portion in which the joined portion of the ground electrode main body part and the noble metal tip are melted. Further, since the Ni alloy constituting the joined portion of the ground electrode main body part contains the specific amounts of Al and Si, it is possible to improve the resistance to oxidization at high temperatures of the ground electrode main body part. Due to this, it is possible to improve the welding strength of the noble metal tip and the ground electrode main body part, thereby preventing the noble metal tip from being detached.

BRIEF DESCRIPTIONS OF THE DRAWINGS

DESCRIPTIONS OF EXEMPLARY EMBODIMENTS

Hereinafter, a spark plug according to a preferred exemplary embodiment of the invention will be described with reference to the drawings.

Figure 1:
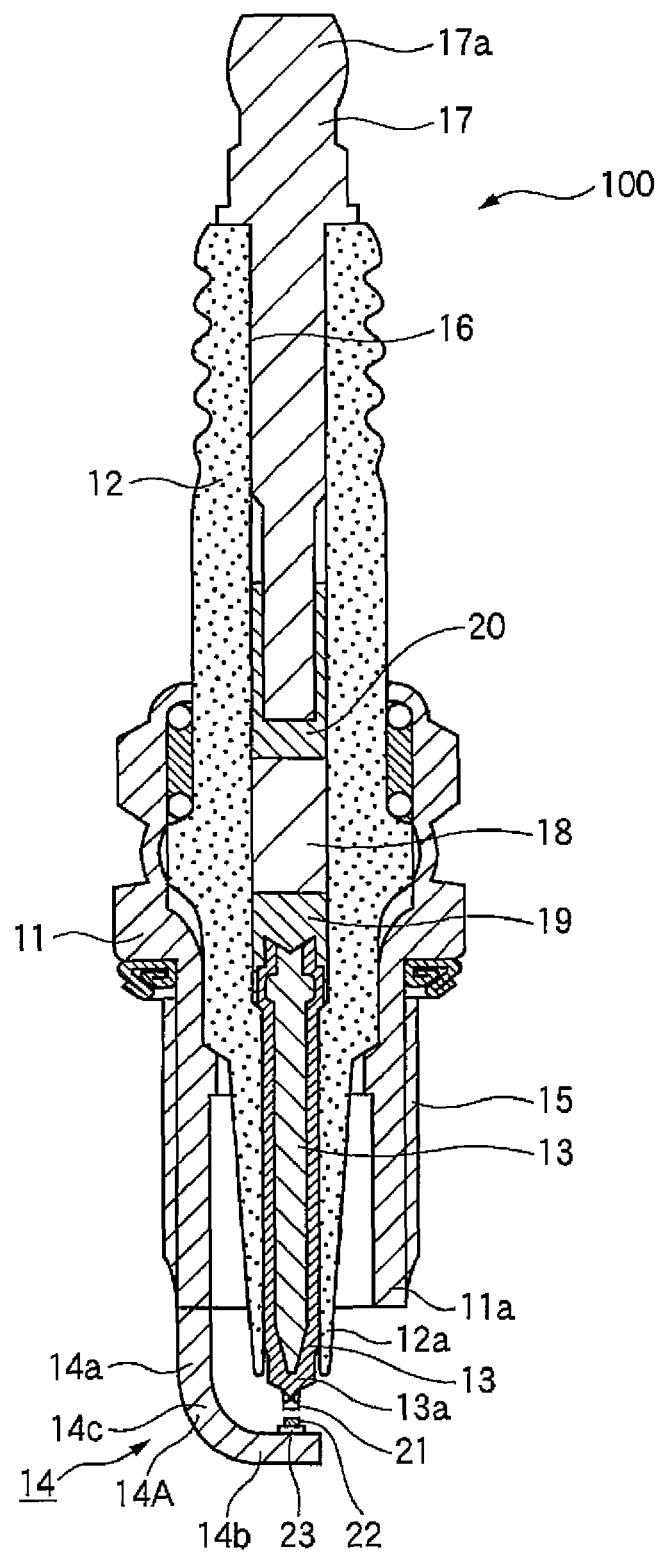
FIG. 1 is a sectional view of a spark plug according to an exemplary embodiment of the invention.
Figure 2:
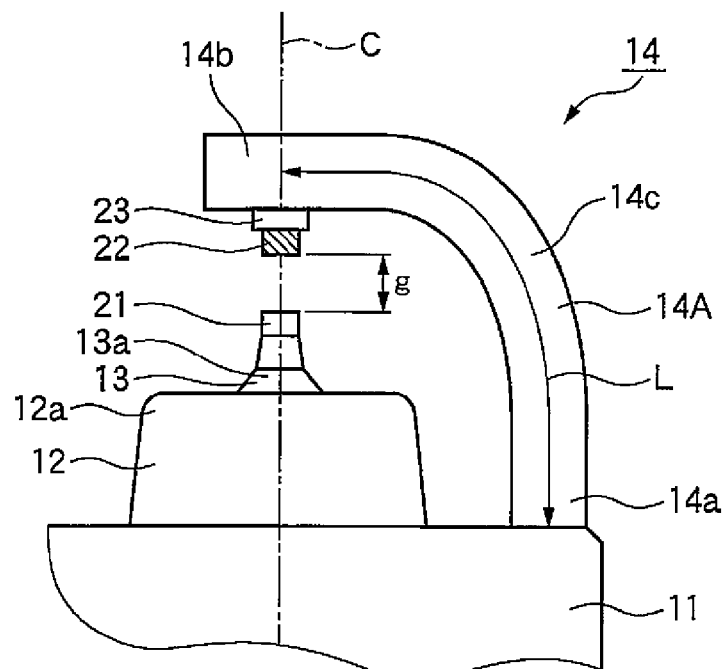
FIG. 2 is an enlarged view the vicinities of a ground electrode of the park plug shown in FIG. 1.

FIG. 1 is a sectional view of a spark plug according to an exemplary embodiment of the invention, and FIG. 2 is an enlarged view the vicinities of a ground electrode of the park plug shown in FIG. 1.

As shown in FIG. 1, a spark plug 100 of the invention comprises a cylindrical metal shell 11, a cylindrical insulator 12 that is fitted in the metal shell 11 and has a leading end 12a exposed from a leading end 11a of the metal shell 11, a center electrode 13 disposed in the insulator 12 so that a leading end 13a thereof is exposed from the leading end 12a of the insulator 12 and a ground electrode 14 that has one end joined to the leading end 11a of the metal shell 11 and the other end facing the leading end 13a of the center electrode 13.

The metal shell 11 is made of carbon steel and the like and is formed at its circumference with a screw part 15 for attaching the spark plug 100 to a cylinder head of an internal combustion engine, for example. A terminal metal fitting 17 is inserted and fixed, with a leading end 17a thereof being exposed, into the insulator 12 made of sintered ceramics such as alumina at a rearward end (the above in FIG. 1) of a through hole 16 that is formed in an axial direction, and the center electrode 13 is inserted and fixed therein at a forward end (the below in FIG. 1) with the leading end 13a being exposed.

Additionally, in the through hole 16, a resistance member 18 is arranged at a central portion between the terminal metal fitting 17 and the center electrode 13 and conductive glass seal layers 19, 20 are disposed at both axial ends of the resistance member 18. In other words, the center electrode 13 and the terminal metal fitting 17 are electrically connected to each other via the resistance member 18 and the conductive glass seal layers 19, 20. The conductive glass seal layers 19, 20 and the resistance member 18 form a conductive connection layer. Meanwhile, it may be possible that the resistance member 18 is omitted and the terminal metal fitting 17 and the center electrode 13 are joined to a single conductive glass seal layer.

As shown in FIG. 2, the center electrode 13 is formed into a cylinder shape by Ni alloy having excellent heat and corrosion resistances. The leading end 13a of the center electrode 13 is fixedly connected with a cylindrical noble metal tip 21 by laser welding and the like, which is made of Ir alloy having Ir as a main component due to its excellent resistance against spark wear. It is preferable that the noble metal tip 21 contains at least one of Pt, Rh, Ru and Ni so as to improve the wear resistance. In the meantime, the main component means a component that is most contained among all components to be contained.

The ground electrode 14 is structured in such a way that the noble metal tip 22 is provided to a position of a ground electrode main body part 14A facing the center electrode 13 while intervening a pedestal 23 between the noble metal tip and the ground electrode main body part. The ground electrode main body part 14A is a prismatic member made of Ni alloy having excellent heat and corrosion resistances and includes a basal portion 14a fixed to the metal shell 12 by welding, a bent portion 14c at a center thereof and a leading end 14b facing the center electrode 13. As a result, the ground electrode main body part is bent into an approximately L shape. Here, cylindrical Pt alloy having Pt as a main component may be used as the noble metal tip 22. It is preferable that the noble metal tip 22 contains at least one of Ir, Rh, Ru and Ni so as to improve the wear resistance.

The pedestal 23 is made of Ni alloy containing 12 to 45 mass % of Cr, 7 mass % or less of Fe, 0.5 to 5 mass % of Al, 0.3 to 5 mass % of Si and 50 mass % or more of the balance. Cr forms a film of $Cr_2O_3$ on a surface of the pedestal, thereby suppressing the high temperature oxidization. However, when the content of Cr is under 12 mass %, it is not possible to obtain the sufficient resistance to oxidization at high temperatures. In the meantime, although the resistance to oxidization at high temperatures is improved as the content of Cr is increased, when the content of Cr exceeds 20 mass %, a γ' phase is formed, so that it is hard to work the alloy. The γ' phase is formed when an equilibrium state is made at 590° C. or less. It is possible to suppress the formation of γ' phase by performing the solid solution treatment/quenching at 590° C. or higher. However, it is possible to suppress the formation of the γ' phase when the content of Cr is 45 mass % or less. In other words, when the content of Cr exceeds 45 mass %, the γ' phase and (Cr) Ni phase are increased, so that it is not possible to work the alloy. In the meantime, it is preferable that the content of Cr is 18 to 30 mass % so as to further improve the workability and the resistance to oxidization at high temperatures.

Since the spark plug is used under high temperature and vibration in the engine, the strength is also required. Accordingly, the solid solution strengthening of material for the pedestal is effective. Due to this, it is necessary to select, as an element to be added to the material for the pedestal, an element having a wide solid solution limit and a free energy of oxide formation equivalent to that of Ni. Further, the cost is also important. Fe is the most suitable element satisfying the above conditions. However, the free energy of oxide formation of Fe is lower than that of Ni, so that Fe forms an oxide more preferentially than Ni. Accordingly, although it is preferable that the content of Fe is theoretically 0%, the alloy may contain 0.00005 mass % of Fe as the lowest limit, taking the strength into consideration. However, when the content of Fe exceeds 7 mass %, the hollow phenomenon is conspicuous at the melted portion of the noble metal tip 22 and the pedestal 23.

The material for the pedestal further contains Al and Si so as to improve the resistance to oxidation at high temperatures. Al forms a film of $Al_2O_3$ just under the film of $Cr_2O_3$ and is thus expected to improve the resistance to oxidation at high temperatures. In addition, Si forms a passive film of $SiO_2$ and is also expected to improve the resistance to oxidization at high temperatures. However, when the content of Al is increased, the workability is lowered. Thus, Al is contained in an amount of 0.5 to 5 mass %. Meanwhile, it is preferable that the lowest limit of the content of Al is 0.7 mass % so as to further improve the resistance to oxidation at high temperatures. In addition, when the content of Si is increased, it may form an alloy having low melting temperature together with the noble metal component, particularly Pt, thereby lowering the welding strength. Accordingly, Si is contained in an amount of 0.3 to 5 mass %. Meanwhile, it is preferable that the lowest limit of the content of Si is 0.7 mass % so as to further improve the resistance to oxidation at high temperatures. In addition, a total content of Al and Si is preferably 8 mass % or less.

The balance of the material for the pedestal except the above elements contains 50 mass % or more of Ni. When Ni having excellent corrosion resistance is contained in an amount of 50 mass % or more, it is possible to effectively suppress pre-ignition from occurring. In the meantime, the Ni content in the balance is preferably 60 mass % or more.

In addition, the material for the pedestal preferably contains Mn so as to further improve the resistance to oxidation at high temperatures. Mn increases the adhesion strength of the $Cr_2O_3$ film and the basic material of the alloy for the pedestal and forms $MnO_2$ just under the $Cr_2O_3$ film, which serves as an oxygen getter and decreases a partial pressure of the oxygen in the pedestal to suppress the internal oxidization. However, when Mn is excessively contained, it reacts with sulfur contained in the combustion gas resulting from the burning of the fuel or engine oil, thereby forming sulfide and thus accelerating the oxidization (corrosion). Due to this, the content of Mn in the material for the pedestal is preferably 0.005 to 5 mass %.

Preferably, the material for the pedestal contains at least one of Y, Hf, Zr, La, Ce and Nd by 0.01 mass % or more, so that it is possible to further improve the resistance to oxidization at high temperatures. However, when the content thereof is too much, the workability is lowered. Accordingly, it is preferable that the content of the above element is 0.4 mass % or less.

The components except the above have no limit and can be appropriately selected and added in accordance with purposes, except inevitable impurities.

The pedestal 23 and the noble metal tip 22 are joined by laser welding or electron beam welding. Although the melted portion formed by the welding is made of the alloy of the material for the pedestal 23 and the material for the noble metal tip 22, since the Fe content of the material for the pedestal 23 is 7 mass % or less, as described above, the content of Fe in the melted portion is also little, so that the formation of iron oxide, which is a main cause of the hollow, is also suppressed. In addition, since the material for the pedestal 23 contains Al and Si and thus the melted portion also contains Al and Si, the resistance to oxidation at high temperatures is further improved. Furthermore, when Mn is contained, the resistance to oxidization at high temperatures is further improved.

To be more specific, when the noble metal tip 22 is made of Pt alloy, the melted portion contains 3 mass % or less of Fe, 10 to 60 mass % of Ni, 15 to 75 mass % of Pt, 4 to 35 mass % of Cr, 0.03 to 2 mass % of Al and 0.03 to 2 mass % of Si. In order to improve the resistance to oxidization at high temperatures, it is more preferable that both contents of Al and Si are 0.1 mass % or more, respectively. In addition, when the material for the pedestal 23 contains Mn, it is preferable that the content of Mn is 0.0025 to 3 mass %.

In addition, when the pedestal 23 contains at least one of Y, Hf, Zr, La, Ce and Nd, the melted portion also contains the corresponding elements. At this time, the content thereof is preferably 0.001 to 0.2 mass %.

Although Cr forms a film of $Cr_2O_3$ to suppress the oxidization, as described above, the melted portion is susceptible to spark erosion, so that the film of $Cr_2O_3$ is destroyed. As a result, the oxygen infiltrates into the melted portion, so that internal oxidization is caused. It is Fe that has the highest influence on the internal oxidization. When the content of Fe in the melted portion is lowered to 3 mass % or less, it is possible to effectively prevent the hollow at the melted portion. In addition, when the content of Ni or Pt in the melted portion is too much or little, a thermal expansion coefficient of the melted portion approaches that of the pedestal or noble metal tip, so that a difference between the thermal expansion coefficients of the melted portion and the noble metal tip or pedestal is increased. When a cooling/heating cycle is applied under such state, a crack is generated between the melted portion and the noble metal tip or pedestal, so that the noble metal tip may be detached from the pedestal. Due to this, Pt and Ni are contained in the amounts as described above. In addition, Al, Si and Mn in the melted portion are contained in the amounts as described above, so that it is possible to improve the resistance to oxidization at high temperatures.

The pedestal 23 forms a columnar support portion at one side thereof to which the noble metal tip 22 is joined and a flange portion having a diameter larger than the support portion at the other side that is joined to the ground electrode main body part 14A. The flange portion of the pedestal 23 is joined to the surface of the ground electrode main body part 14A by resistance welding. A spark discharge gap (g) is formed between the noble metal tip 22 and the leading end 13a of the center electrode 13. The pedestal 23 and the noble metal tip 22 are previously joined to each other by the laser welding or electron beam welding to form a joined body, which is then joined to the ground electrode main body part 14A by the resistance welding.

In addition, preferably, when a longitudinal length of the ground electrode main body part from the joined portion thereof with the metal shell 11 to a center C of the joined position of the noble metal tip 22 is L and a cross sectional area of the ground electrode main body part perpendicular to the longitudinal direction is (S), the ground electrode main body part 14A satisfies a relation of $29 \leq L^2/S \leq 49$ and a thermal conductivity thereof is 18 W/(m·K) or less at room temperatures. As the cross sectional area (S) of the ground electrode main body part 14A is decreased and the length (L) thereof is lengthened, i.e., when $L^2/S$ is 29 or higher, the temperature of the melted portion is increased. Further, when the thermal conductivity of the ground electrode main body part 14A is 18 W/(m·K) or less, since the heat applied to the ground electrode 14 is difficult to escape to the metal shell 11, the temperature of the melted portion tends to increase. However, the pedestal 23 is made of the above-described alloy, so that it is possible to effectively prevent the hollow from occurring at the melted portion. Meanwhile, when $L^2/S$ is smaller than 29, the temperature of the melted portion is not increased so much, so that the hollow does not occur at the melted portion. In other words, it is difficult to achieve the effects of the invention. In addition, when $L^2/S$ is greater than 49, the temperature of the leading end 14b is excessively increased, so that the pre-ignition is easy to occur.

In addition, although the ground electrode main body part 14A is made of Ni alloy, it is preferable that 10% or more of the cross sectional area (S) is made of metal or alloy having a thermal conductivity of 250 W/(m·K) at room temperatures and satisfies a relation of $35 \leq L^2/S \leq 70$, within a range of ½ or more of the longitudinal length (L) of the ground electrode main body part, preferably over the whole length. When metal or alloy having a thermal conductivity of 250 W/(m·K) or more at room temperatures is used, the temperature of the melted portion is difficult to increase, so that the hollow is effectively suppressed and the pre-ignition is also suppressed. In the meantime, as the metal having a thermal conductivity of 250 W/(m·K) or more at room temperatures, Cu or Cu alloy is preferable because it is cheap and has good workability. In addition, the ground electrode main body part 14A is structured in such a way that a core thereof is made of the above metal and Ni alloy surrounds the core.

The invention can be variously changed. For example, it may be possible that the pedestal 23 is omitted and the noble metal tip 22 is directly joined to the ground electrode main body part 14A by the laser welding. At this time, it is preferable that at least the joined portion of the ground electrode main body part 14A (preferably, the entire ground electrode main body part), to which the noble metal tip 22 is joined, is made of the above-described alloy.

EXAMPLES

Hereinafter, the invention will be more specifically described with reference to examples. However, it should be noted that the invention is not limited thereto.

Experiment-1

Wires having a cross sectional shape of a height 1.4 mm and a width 2.5 mm and pedestals having support portions of a diameter 0.8 mm and flange portions were manufactured by working ingots made of materials shown in Table 1. Columnar bodies made of Pt-10Rh (Pt containing 10 mass % of Rh) and having a diameter of 0.74 mm were prepared as noble metal tips. Then, the noble metal tips and the pedestals were joined by the laser welding. In the meantime, the balances in Table 1 are inevitable impurities. Here, for assessing the workability of the wires and the pedestals, it was checked whether a scar or crack was formed surfaces or insides of the wires and the pedestals after the manufacturing. When there was no scar or crack, "○" was indicated in Table 1 and when a scar or crack was formed, "×" was indicated in Table 1.

As a desk test, spark plugs each having a joined body in which the pedestal of different composition and the noble metal tip are welded together were mounted to a cooling/heating tester of 1200° C., which were then subject to heating of 2 minutes by a gas burner and cooling of 1 minute, which formed one cycle. After 600 cycles, the melted portions were examined. When there was no whisker-like precipitate in the melted portions, "○" was indicated in the column of the desk test assessment of Table 1, which means success in test, and when there was whisker-like precipitate in the melted portions, "×" was indicated. In the meantime, when the noble metal tip was detached from the pedestal during the test, "det." was indicated.

In addition, as an endurance test for an actual machine, the spark plugs same as those used in the desk test were mounted to an 2000 cc in-line six cylinders engine, which were then subject to 5500 rpm (full throttle) for one minute and 750 rpm (idling) for one minute, which formed one cycle. It was checked whether the hollow was generated and whether the noble metal tip was detached for every 50 hours. Regarding the hollow assessment, when the smallest outer diameter part of the melted portion of the pedestal and the noble metal tip was inwardly bored (hollow) by 0.05 mm or more as compared to the original side of the noble metal tip, "×" was indicated in the column of the actual machine assessment of Table 1 and when the degree of the hollow was less than 0.05 mm, "○" was indicated. In addition, when the noble metal tip was detached from the pedestal during the endurance test, "det." was indicated.

TABLE 1

| | Ni | Fe | Cr | Mn | Al | Si | Y | Hf | Zr | La | Ce | Nd | Workability test | Desk test | Actual machine assessment 200 hr | 250 hr | 300 hr |
|---|---|---|---|---|---|---|---|---|---|---|---|---|---|---|---|---|---|
| Comparative Example 1 | 63.1 | 10 | 25 | 0.5 | 0.7 | 0.7 | | | | | | | ○ | × | Det. | | |
| Comparative Example 2 | 50.1 | 0 | 48 | 0.5 | 0.7 | 0.7 | | | | | | | × | ○ | Det. | | |
| Comparative Example 3 | 86.6 | 0 | 11.5 | 0.5 | 0.7 | 0.7 | | | | | | | ○ | Det. | Det. | | |
| Comparative Example 4 | 67.8 | 0 | 25 | 0.5 | 6 | 0.7 | | | | | | | × | ○ | Det. | | |
| Comparative Example 5 | 73.8 | 0 | 25 | 0.5 | 0 | 0.7 | | | | | | | ○ | ○ | Det. | | |
| Comparative Example 6 | 67.8 | 0 | 25 | 0.5 | 0.7 | 6 | | | | | | | ○ | × | Det. | | |
| Comparative Example 7 | 73.7 | 0 | 25 | 0.5 | 0.7 | 0.1 | | | | | | | ○ | Det. | Det. | | |
| Example 1 | 73.1 | 0 | 25 | 0.5 | 0.7 | 0.7 | | | | | | | ○ | ○ | ○ | ○ | Det. |
| Example 2 | 66.1 | 7 | 25 | 0.5 | 0.7 | 0.7 | | | | | | | ○ | ○ | ○ | ○ | Det. |
| Example 3 | 53.1 | 0 | 45 | 0.5 | 0.7 | 0.7 | | | | | | | ○ | ○ | ○ | ○ | Det. |
| Example 4 | 86.1 | 0 | 12 | 0.5 | 0.7 | 0.7 | | | | | | | ○ | ○ | ○ | ○ | Det. |
| Example 5 | 68.8 | 0 | 25 | 0.5 | 5 | 0.7 | | | | | | | ○ | ○ | ○ | ○ | Det. |
| Example 6 | 73.4 | 0 | 25 | 0.5 | 0.51 | 0.7 | | | | | | | ○ | ○ | ○ | Det. | |
| Example 7 | 68.8 | 0 | 25 | 0.5 | 0.7 | 5 | | | | | | | ○ | ○ | ○ | ○ | Det. |
| Example 8 | 73.4 | 0 | 25 | 0.5 | 0.7 | 0.31 | | | | | | | ○ | ○ | ○ | Det. | |
| Example 9 | 73.09 | 0 | 25 | 0.5 | 0.7 | 0.7 | 0.01 | | | | | | ○ | ○ | ○ | ○ | ○ |
| Example 10 | 72.7 | 0 | 25 | 0.5 | 0.7 | 0.7 | 0.4 | | | | | | ○ | ○ | ○ | ○ | ○ |

TABLE 1-continued

|  | Ni | Fe | Cr | Mn | Al | Si | Y | Hf | Zr | La | Ce | Nd | Workability test | Desk test | Actual machine assessment 200 hr | 250 hr | 300 hr |
|---|---|---|---|---|---|---|---|---|---|---|---|---|---|---|---|---|---|
| Example 11 | 73.09 | 0 | 25 | 0.5 | 0.7 | 0.7 |  | 0.01 |  |  |  |  | ○ | ○ | ○ | ○ | ○ |
| Example 12 | 72.7 | 0 | 25 | 0.5 | 0.7 | 0.7 |  | 0.4 |  |  |  |  | ○ | ○ | ○ | ○ | ○ |
| Example 13 | 73.09 | 0 | 25 | 0.5 | 0.7 | 0.7 |  |  | 0.01 |  |  |  | ○ | ○ | ○ | ○ | ○ |
| Example 14 | 72.7 | 0 | 25 | 0.5 | 0.7 | 0.7 |  |  | 0.4 |  |  |  | ○ | ○ | ○ | ○ | ○ |
| Example 15 | 73.09 | 0 | 25 | 0.5 | 0.7 | 0.7 |  |  |  | 0.01 |  |  | ○ | ○ | ○ | ○ | ○ |
| Example 16 | 72.7 | 0 | 25 | 0.5 | 0.7 | 0.7 |  |  |  | 0.4 |  |  | ○ | ○ | ○ | ○ | ○ |
| Example 17 | 73.09 | 0 | 25 | 0.5 | 0.7 | 0.7 |  |  |  |  | 0.01 |  | ○ | ○ | ○ | ○ | ○ |
| Example 18 | 72.7 | 0 | 25 | 0.5 | 0.7 | 0.7 |  |  |  |  | 0.4 |  | ○ | ○ | ○ | ○ | ○ |
| Example 19 | 73.09 | 0 | 25 | 0.5 | 0.7 | 0.7 |  |  |  |  |  | 0.01 | ○ | ○ | ○ | ○ | ○ |
| Example 20 | 72.7 | 0 | 25 | 0.5 | 0.7 | 0.7 |  |  |  |  |  | 0.4 | ○ | ○ | ○ | ○ | ○ |

It can be seen from Table 1 that it is possible to suppress the hollow from occurring at the melted portion of the pedestal and the noble metal tip, to improve the resistance to oxidization at high temperatures of the melted portion and to suppress the detachment of the noble metal tip by using the pedestal having the composition according to the invention. Practically, 200 hours or more is preferable and the effectiveness of the pedestal having the composition according to the invention is apparent. In addition, it can be seen that the pedestal having the composition according to the invention also has the excellent workability. Additionally, it can be seen that Al is contained in the amount of 0.7 mass % or more and Si is contained in the amount of 0.7 mass % or more, so that the resistance to oxidization at high temperatures of the pedestal is further improved and the detachment of the noble metal tip is further suppressed.

Experiment-2

Figure 3:
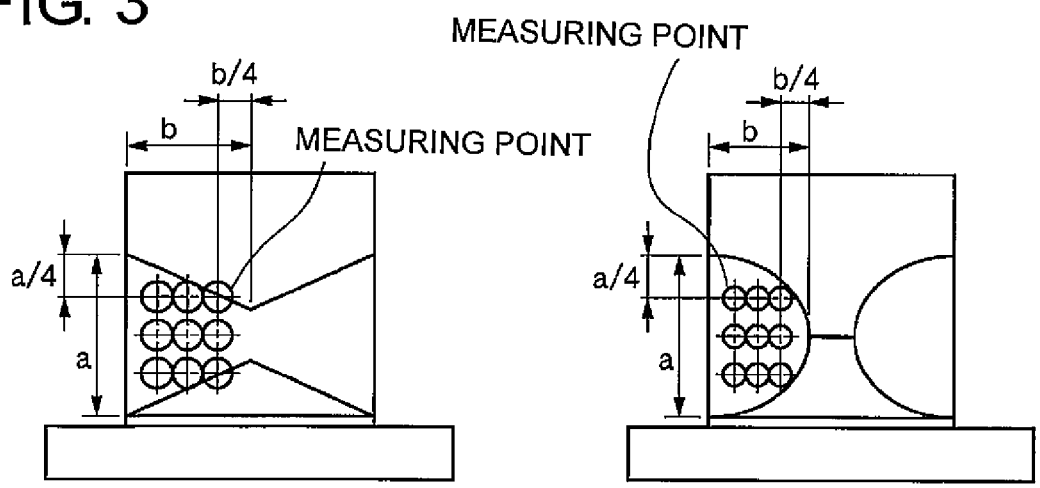
FIG. 3 is a view illustrating a sampling portion of a melted portion in an exemplary embodiment.

The pedestals manufactured in Experiment-1 and the noble metal tips made of Pt-10Rh were joined by the laser welding. As schematically shown in FIG. 3, in a half cross section, the maximum length of the longitudinal direction of the welded portion was a, the maximum length of the depth direction was b, three imaginary lines of quartering each length were drawn in each direction and nine intersection points were sampled, for which a composition analysis was then performed with SEM. In analysis results, it was determined that when the content of Pt was 0~80 mass %, the sampling position was in the melted portion and otherwise the sampling position was in the pedestal or noble metal tip. Through this, an average of the analysis values of the sampling positions in the melted portion was obtained. Results thereof are shown in Table 2.

In addition, spark plugs each having a joined body in which the pedestal of different compositions and the noble metal tip are welded together were manufactured and subject to the endurance test for an actual machine. Results thereof are shown in Table 2.

TABLE 2

|  | Pedestal | Pt | Rh | Ni | Fe | Cr | Mn | Al | Si | Y | Hf |
|---|---|---|---|---|---|---|---|---|---|---|---|
| Comparative Example 8 | Comparative Example 1 | 62.30 | 6.90 | 19.40 | 3.40 | 7.70 | 0.10 | 0.10 | 0.10 |  |  |
| Comparative Example 9 | Comparative Example 2 | 18.90 | 2.10 | 40.00 | 0.00 | 37.50 | 0.40 | 0.55 | 0.55 |  |  |
| Comparative Example 10 | Comparative Example 3 | 62.55 | 7.00 | 26.65 | 0.00 | 3.50 | 0.10 | 0.10 | 0.10 |  |  |
| Comparative Example 11 | Comparative Example 4 | 61.84 | 6.88 | 21.18 | 0.00 | 7.70 | 0.10 | 2.20 | 0.10 |  |  |
| Comparative Example 12 | Comparative Example 5 | 62.48 | 6.90 | 22.72 | 0.00 | 7.70 | 0.10 | 0.00 | 0.10 |  |  |
| Comparative Example 13 | Comparative Example 6 | 62.20 | 6.80 | 20.90 | 0.00 | 7.70 | 0.10 | 0.10 | 2.20 |  |  |
| Comparative Example 14 | Comparative Example 7 | 62.47 | 6.95 | 22.68 | 0.00 | 7.70 | 0.10 | 0.10 | 0.00 |  |  |
| Example 21 | Example 1 | 62.50 | 7.00 | 22.50 | 0.00 | 7.70 | 0.10 | 0.10 | 0.10 |  |  |
| Example 22 | Example 2 | 61.76 | 6.90 | 20.34 | 3 | 7.70 | 0.1 | 0.1 | 0.1 |  |  |
| Example 23 | Example 3 | 21.05 | 2.35 | 41.3 | 0 | 35 | 0.1 | 0.1 | 0.1 |  |  |
| Example 24 | Example 4 | 62.30 | 6.9 | 26.5 | 0 | 4 | 0.1 | 0.1 | 0.1 |  |  |
| Example 25 | Example 5 | 62.00 | 6.90 | 21.2 | 0 | 7.70 | 0.1 | 2 | 0.1 |  |  |
| Example 26 | Example 6 | 62.47 | 7.00 | 22.60 | 0.00 | 7.70 | 0.10 | 0.03 | 0.10 |  |  |
| Example 27 | Example 7 | 62.02 | 6.90 | 21.18 | 0 | 7.70 | 0.1 | 0.1 | 2 |  |  |
| Example 28 | Example 8 | 62.48 | 7.00 | 22.59 | 0.00 | 7.70 | 0.10 | 0.10 | 0.03 |  |  |
| Example 29 | Example 9 | 62.50 | 7.00 | 22.50 | 0.00 | 7.70 | 0.10 | 0.1 | 0.1 | 0.001 |  |
| Example 30 | Example 10 | 62.50 | 6.90 | 22.40 | 0.00 | 7.70 | 0.10 | 0.1 | 0.1 | 0.20 |  |
| Example 31 | Example 11 | 62.50 | 7.00 | 22.50 | 0.00 | 7.70 | 0.10 | 0.1 | 0.1 |  | 0.001 |
| Example 32 | Example 12 | 62.50 | 6.90 | 22.40 | 0.00 | 7.70 | 0.10 | 0.1 | 0.1 |  | 0.2 |
| Example 33 | Example 13 | 62.50 | 7.00 | 22.50 | 0.00 | 7.70 | 0.10 | 0.1 | 0.1 |  |  |
| Example 34 | Example 14 | 62.50 | 6.90 | 22.40 | 0.00 | 7.70 | 0.10 | 0.1 | 0.1 |  |  |
| Example 35 | Example 15 | 62.50 | 7.00 | 22.50 | 0.00 | 7.70 | 0.10 | 0.1 | 0.1 |  |  |
| Example 36 | Example 16 | 62.50 | 6.90 | 22.40 | 0.00 | 7.70 | 0.10 | 0.1 | 0.1 |  |  |
| Example 37 | Example 17 | 62.50 | 7.00 | 22.50 | 0.00 | 7.70 | 0.10 | 0.1 | 0.1 |  |  |
| Example 38 | Example 18 | 62.50 | 6.90 | 22.40 | 0.00 | 7.70 | 0.10 | 0.1 | 0.1 |  |  |
| Example 39 | Example 19 | 62.50 | 7.00 | 22.50 | 0.00 | 7.70 | 0.10 | 0.1 | 0.1 |  |  |

TABLE 2-continued

| Example 40 | Example 20 | 62.50 | 6.90 | 22.40 | 0.00 | 7.70 | 0.10 | 0.1 | 0.1 |
|---|---|---|---|---|---|---|---|---|---|

|  | Zr | La | Ce | Nd | Actual machine assessment | | | | |
|---|---|---|---|---|---|---|---|---|---|
|  |  |  |  |  | 100 hr | 150 hr | 200 hr | 250 hr | 300 hr |
| Comparative Example 8 |  |  |  |  | X | Det. |  |  |  |
| Comparative Example 9 |  |  |  |  | X | Det. |  |  |  |
| Comparative Example 10 |  |  |  |  | Det. |  |  |  |  |
| Comparative Example 11 |  |  |  |  | ○ | Det. |  |  |  |
| Comparative Example 12 |  |  |  |  | Det. |  |  |  |  |
| Comparative Example 13 |  |  |  |  | X | Det. |  |  |  |
| Comparative Example 14 |  |  |  |  | Det. |  |  |  |  |
| Example 21 |  |  |  |  | ○ | ○ | ○ | ○ | Det. |
| Example 22 |  |  |  |  | ○ | ○ | ○ | ○ | Det. |
| Example 23 |  |  |  |  | ○ | ○ | ○ | ○ | Det. |
| Example 24 |  |  |  |  | ○ | ○ | ○ | ○ | Det. |
| Example 25 |  |  |  |  | ○ | ○ | ○ | ○ | Det. |
| Example 26 |  |  |  |  | ○ | ○ | ○ | Det. |  |
| Example 27 |  |  |  |  | ○ | ○ | ○ | ○ | Det. |
| Example 28 |  |  |  |  | ○ | ○ | ○ | Det. |  |
| Example 29 |  |  |  |  | ○ | ○ | ○ | ○ | ○ |
| Example 30 |  |  |  |  | ○ | ○ | ○ | ○ | ○ |
| Example 31 |  |  |  |  | ○ | ○ | ○ | ○ | ○ |
| Example 32 |  |  |  |  | ○ | ○ | ○ | ○ | ○ |
| Example 33 | 0.001 |  |  |  | ○ | ○ | ○ | ○ | ○ |
| Example 34 | 0.2 |  |  |  | ○ | ○ | ○ | ○ | ○ |
| Example 35 |  | 0.001 |  |  | ○ | ○ | ○ | ○ | ○ |
| Example 36 |  | 0.2 |  |  | ○ | ○ | ○ | ○ | ○ |
| Example 37 |  |  | 0.001 |  | ○ | ○ | ○ | ○ | ○ |
| Example 38 |  |  | 0.2 |  | ○ | ○ | ○ | ○ | ○ |
| Example 39 |  |  |  | 0.001 | ○ | ○ | ○ | ○ | ○ |
| Example 40 |  |  |  | 0.2 | ○ | ○ | ○ | ○ | ○ |

It can be seen from Table 2 that when the content of Fe is 3 mass % or less in the melted portion of the pedestal and the noble metal tip, the hollow of the melted portion is suppressed. In addition, it can be seen that when the content of Cr is 4 to 35 mass %, the content of Al is 0.03 to 2 mass % and the content of Si is 0.03 to 2 mass %, the resistance to oxidization at high temperatures of the melted portion is improved and the detachment of the noble metal tip is suppressed. Additionally, it can be seen that when the content of Al is 0.2 mass % or more and the content of Si is 0.2 mass % or more, the resistance to oxidization at high temperatures of the melted portion is further improved and the detachment of the noble metal tip is further suppressed.

Experiment-3

Spark plugs each having a joined body in which the pedestal of different compositions and the noble metal tip made of Pt-10Rh are welded together were manufactured so that the alloy compositions of the melted portions were as shown in Table 3, and mounted to a cooling/heating tester of 1000° C., which were then subject to heating of 2 minutes by a gas burner and cooling of 1 minute, which formed one cycle. After 1000 cycles, the melted portions were examined. When an oxidization scale of the melted portion was less than 50%, "○" was indicated in Table 3, and when the oxidization scale of the melted portion was 50% or more, "×" was indicated.

TABLE 3

|  | Pt | Rh | Ni | Fe | Cr | Mn | Al | Si | Y | Hf | Zr | La | Ce | Nd | Assessment |
|---|---|---|---|---|---|---|---|---|---|---|---|---|---|---|---|
| Example 41 | 75.00 | 8 | 10 | 0 | 6.7 | 0.1 | 0.1 | 0.1 |  |  |  |  |  |  | ○ |
| Example 42 | 15.00 | 4.5 | 60 | 0 | 20.2 | 0.1 | 0.1 | 0.1 |  |  |  |  |  |  | ○ |
| Comparative Example 15 | 76.00 | 8 | 10.10 | 0 | 5.6 | 0.1 | 0.1 | 0.1 |  |  |  |  |  |  | X |
| Comparative Example 16 | 14.00 | 4.5 | 60 | 0 | 21.2 | 0.1 | 0.1 | 0.1 |  |  |  |  |  |  | X |
| Comparative Example 17 | 15.00 | 4.5 | 60.70 | 0 | 19.5 | 0.1 | 0.1 | 0.1 |  |  |  |  |  |  | X |
| Comparative Example 18 | 75.10 | 8 | 9.50 | 0 | 7.1 | 0.1 | 0.1 | 0.1 |  |  |  |  |  |  | X |

It can be seen from Table 3 that when the content of Pt in the melted portion is 15 to 75 mass % and the content of Ni is 10 to 60 mass %, it is possible to suppress the oxidization scale under 50% and to secure the welding strength between the noble metal tip and the pedestal.

Experiment-4

Spark plugs each having a joined body in which the pedestals made of materials shown in Table 4 and the noble metal tips made of Pt-10Rh are welded together were manufactured and mounted to an 2000 cc in-line six cylinders engine, which were then subject to 5500 rpm (full throttle) for one minute and 750 rpm (idling) for one minute with fuel containing sulfur 0.03 mass % of sulfur, which formed one cycle. Like Experiment-1, it was checked whether the hollow was generated and whether the noble metal tip was detached for every 50 hours. Results thereof are shown in Table 4.

TABLE 4

|  | Ni | Fe | Cr | Mn | Al | Si | Y | Hf | Zr | La | Ce | Nd | Actual machine assessment 100 hr | 150 hr | 200 hr |
|---|---|---|---|---|---|---|---|---|---|---|---|---|---|---|---|
| Example 43 | 73.1 | 0 | 25 | 0.5 | 0.7 | 0.7 |  |  |  |  |  |  | ○ | ○ | ○ |
| Example 44 | 68.6 | 0 | 25 | 5 | 0.7 | 0.7 |  |  |  |  |  |  | ○ | ○ | ○ |
| Example 45 | 73.595 | 0 | 25 | 0.005 | 0.7 | 0.7 |  |  |  |  |  |  | ○ | ○ | ○ |
| Comparative Example 19 | 68.3 | 0 | 25 | 5.3 | 0.7 | 0.7 |  |  |  |  |  |  | ○ | det. |  |
| Comparative Example 20 | 73.598 | 0 | 25 | 0.002 | 0.7 | 0.7 |  |  |  |  |  |  | ○ | det. |  |

It can be seen from Table 4 that when the pedestal contains 0.005 to 5 mass % of Mn, it is possible to secure the resistance to oxidization at high temperatures of the pedestal and to suppress the detachment of the noble metal tip even when the fuel containing much sulfur is used.

Experiment-5

Spark plugs each having a joined body in which the pedestal of different compositions and the noble metal tip made of Pt-10Rh are welded together were manufactured so that the alloy compositions of the melted portions were as shown in Table 5 and were subject to assessment same as Experiment-4, in which it was checked whether the hollow was generated and whether the noble metal tip was detached for every 50 hours.

It can be seen from Table 5 that when the pedestal contains 0.0025 to 3 mass % of Mn, it is possible to secure resistance to oxidization at the high temperatures of the melted portion and to suppress the detachment of the noble metal tip even when the fuel containing much sulfur is used.

Experiment-6

The ground electrode main body parts made of Ni alloy and having a thermal conductivity of 14 W/(m·K), 18 W/(m·K) or 20 W/(m·K) and different lengths L and cross sectional areas S were manufactured. The joined body having joined the pedestal of comparative example 1 or inventive example 10 and the noble metal tip made of Pt-10Rh was joined to each ground electrode main body part to manufacture the ground electrodes. The spark plugs having each ground electrode were mounted to an 2000 cc in-line six cylinders engine, which were then subject to 5500 rpm (full throttle) for one minute and 750 rpm (idling) for one minute, which formed one cycle. Like Experiment-1, it was checked whether the hollow was generated after 200 hours. Results thereof are shown in Table 6 to 8. In Tables, "-" indicates the case where the hollow was not generated in both the pedestal of comparative example 1 and the pedestal of example 10, "○" indicates the case where the hollow was generated in the pedestal of comparative example 1 and the hollow was not generated in the pedestal of example 10, which means that there is the effect of suppressing the hollow, and "×" indicates the case where the hollow was generated in both the pedestal of comparative example 1 and the pedestal of example 10. In addition, "Pre-ignition" indicates that the pre-ignition was generated and thus the corresponding spark plug could not be used as a spark plug.

TABLE 5

|  | Pt | Rh | Ni | Fe | Cr | Mn | Al | Si | Y | Hf | Zr | La | Ce | Nd | Actual machine assessment 100 hr | 150 hr | 200 hr |
|---|---|---|---|---|---|---|---|---|---|---|---|---|---|---|---|---|---|
| Example 46 | 62.50 | 7.00 | 22.50 | 0.00 | 7.70 | 0.10 | 0.10 | 0.10 |  |  |  |  |  |  | ○ | ○ | ○ |
| Example 47 | 61.19 | 6.80 | 21.11 | 0 | 7.70 | 3 | 0.10 | 0.10 |  |  |  |  |  |  | ○ | ○ | ○ |
| Example 48 | 62.50 | 6.95 | 22.65 | 0 | 7.70 | 0.003 | 0.10 | 0.10 |  |  |  |  |  |  | ○ | ○ | ○ |
| Comparative Example 21 | 60.83 | 6.75 | 21.02 | 0.00 | 7.70 | 3.50 | 0.10 | 0.10 |  |  |  |  |  |  | ○ | Det. |  |
| Comparative Example 22 | 62.50 | 6.95 | 22.65 | 0.00 | 7.70 | 0.00 | 0.10 | 0.10 |  |  |  |  |  |  | ○ | Det. |  |

TABLE 6

| Thermal conductivity | S | L | L^2/S | Comparative Article | Present invention | Determination |
|---|---|---|---|---|---|---|
| 14 | 4.2 | 10 | 23.81 | No | No | — |
|  | 4.2 | 10.5 | 26.25 | No | No | — |
|  | 4.2 | 11 | 28.81 | yes | No | ○ |
|  | 4.2 | 11.1 | 29.34 | yes | No | ○ |
|  | 4.2 | 11.5 | 31.49 | yes | No | ○ |
|  | 4.2 | 12 | 34.29 | yes | No | ○ |
|  | 4.2 | 13 | 40.24 | yes | No | ○ |
|  | 4.2 | 14 | 46.67 | yes | No | ○ |
|  | 4.2 | 14.2 | 48.01 | yes | No | ○ |
|  | 4.2 | 14.5 | 50.06 | Pre-ignition | Pre-ignition | X |
|  | 4.2 | 15 | 53.57 | Pre-ignition | Pre-ignition | X |
|  | 3.5 | 9 | 23.14 | No | No | — |
|  | 3.5 | 9.5 | 25.79 | No | No | — |
|  | 3.5 | 10 | 28.57 | No | No | — |
|  | 3.5 | 10.2 | 29.73 | Yes | No | ○ |
|  | 3.5 | 10.5 | 31.50 | Yes | No | ○ |
|  | 3.5 | 11 | 34.57 | Yes | No | ○ |
|  | 3.5 | 12 | 41.14 | Yes | No | ○ |
|  | 3.5 | 13 | 48.29 | Yes | No | ○ |
|  | 3.5 | 13.1 | 49.03 | Yes | No | ○ |
|  | 3.5 | 13.2 | 49.78 | Pre-ignition | Pre-ignition | X |
|  | 3.5 | 13.5 | 52.07 | Pre-ignition | Pre-ignition | X |
|  | 3.5 | 14 | 56.00 | Pre-ignition | Pre-ignition | X |
|  | 2.4 | 7 | 20.42 | No | No | — |
|  | 2.4 | 8 | 26.67 | No | No | — |
|  | 2.4 | 8.1 | 27.34 | No | No | — |
|  | 2.4 | 8.2 | 28.02 | Yes | No | ○ |
|  | 2.4 | 8.5 | 30.10 | Yes | No | ○ |
|  | 2.4 | 9 | 33.75 | Yes | No | ○ |
|  | 2.4 | 9.5 | 37.60 | Yes | No | ○ |
|  | 2.4 | 10 | 41.67 | Yes | No | ○ |
|  | 2.4 | 10.5 | 45.94 | Yes | No | ○ |
|  | 2.4 | 10.8 | 48.60 | Yes | No | ○ |
|  | 2.4 | 10.9 | 49.50 | Pre-ignition | Pre-ignition | X |
|  | 2.4 | 11 | 50.42 | Pre-ignition | Pre-ignition | X |

TABLE 7

| Thermal conductivity | S | L | L^2/S | Comparative Article | Present invention | Determination |
|---|---|---|---|---|---|---|
| 18 | 4.2 | 10 | 23.81 | No | No | — |
|  | 4.2 | 11 | 28.81 | No | No | — |
|  | 4.2 | 11.1 | 29.34 | Yes | No | ○ |
|  | 4.2 | 11.5 | 31.49 | Yes | No | ○ |
|  | 4.2 | 12 | 34.29 | Yes | No | ○ |
|  | 4.2 | 13 | 40.24 | Yes | No | ○ |
|  | 4.2 | 14 | 46.67 | Yes | No | ○ |
|  | 4.2 | 14.5 | 50.06 | Pre-ignition | Pre-ignition | X |
|  | 3.5 | 9.5 | 25.79 | No | No | — |
|  | 3.5 | 10 | 28.57 | No | No | — |
|  | 3.5 | 10.1 | 29.15 | Yes | No | ○ |
|  | 3.5 | 11 | 34.57 | Yes | No | ○ |
|  | 3.5 | 12 | 41.14 | Yes | No | ○ |
|  | 3.5 | 13 | 48.29 | Yes | No | ○ |
|  | 3.5 | 13.1 | 49.03 | Pre-ignition | Pre-ignition | X |
|  | 2.4 | 8 | 26.67 | No | No | — |
|  | 2.4 | 8.2 | 28.02 | No | No | — |
|  | 2.4 | 8.3 | 28.70 | No | No | — |
|  | 2.4 | 8.4 | 29.40 | Yes | No | ○ |
|  | 2.4 | 9 | 33.75 | Yes | No | ○ |
|  | 2.4 | 10 | 41.67 | Yes | No | ○ |
|  | 2.4 | 10.5 | 45.94 | Yes | No | ○ |
|  | 2.4 | 10.8 | 48.60 | Yes | No | ○ |
|  | 2.4 | 10.9 | 49.50 | Pre-ignition | Pre-ignition | X |
|  | 2.4 | 11 | 50.42 | Pre-ignition | Pre-ignition | X |
|  | 2.2 | 7 | 22.27 | No | No | — |
|  | 2.2 | 7.8 | 27.65 | No | No | — |
|  | 2.2 | 7.9 | 28.37 | No | No | — |
|  | 2.2 | 8 | 29.09 | Yes | No | ○ |
|  | 2.2 | 9 | 36.82 | Yes | No | ○ |
|  | 2.2 | 10 | 45.45 | Yes | No | ○ |
|  | 2.2 | 10.3 | 48.22 | Yes | No | ○ |
|  | 2.2 | 10.4 | 49.16 | Pre-ignition | Pre-ignition | X |
|  | 2.2 | 10.5 | 50.11 | Pre-ignition | Pre-ignition | X |
|  | 2.2 | 11 | 55.00 | Pre-ignition | Pre-ignition | X |

TABLE 8

| Thermal conductivity | S | L | L^2/S | Comparative Article | Present invention | Determination |
|---|---|---|---|---|---|---|
| 20 | 4.2 | 10 | 23.81 | No | No | — |
|  | 4.2 | 10.5 | 26.25 | No | No | — |
|  | 4.2 | 11 | 28.81 | No | No | ○ |
|  | 4.2 | 11.5 | 31.49 | No | No | ○ |
|  | 4.2 | 12 | 34.29 | Yes | No | ○ |
|  | 4.2 | 12.5 | 37.20 | Yes | No | ○ |
|  | 4.2 | 13 | 40.24 | Yes | No | ○ |
|  | 4.2 | 13.5 | 43.39 | Yes | No | ○ |
|  | 4.2 | 14 | 46.67 | Yes | No | ○ |
|  | 4.2 | 14.5 | 50.06 | Yes | No | ○ |
|  | 4.2 | 15 | 53.57 | Yes | No | ○ |
|  | 4.2 | 15.5 | 57.20 |  |  | X |
|  | 3.5 | 9.5 | 25.79 | No | No | — |
|  | 3.5 | 10 | 28.57 | No | No | — |
|  | 3.5 | 10.5 | 31.50 | No | No | — |
|  | 3.5 | 11 | 34.57 | Yes | No | ○ |
|  | 3.5 | 11.5 | 37.79 | Yes | No | ○ |
|  | 3.5 | 12 | 41.14 | Yes | No | ○ |
|  | 3.5 | 12.5 | 44.64 | Yes | No | ○ |
|  | 3.5 | 13 | 48.29 | Yes | No | ○ |
|  | 3.5 | 13.5 | 52.07 | Yes | No | ○ |
|  | 3.5 | 14 | 56.00 |  |  | X |
|  | 2.4 | 8.5 | 30.10 | No | No | — |
|  | 2.4 | 9 | 33.75 | Yes | No | ○ |
|  | 2.4 | 9.5 | 37.60 | Yes | No | ○ |
|  | 2.4 | 10 | 41.67 | Yes | No | ○ |
|  | 2.4 | 10.5 | 45.94 | Yes | No | ○ |
|  | 2.4 | 11 | 50.42 |  |  | X |
|  | 2.4 | 11.5 | 55.10 |  |  | X |
|  | 2.4 | 12 | 60.00 |  |  | X |
|  | 2.2 | 8 | 29.09 | No | No | — |
|  | 2.2 | 8.5 | 32.84 | Yes | No | ○ |
|  | 2.2 | 9 | 36.82 | Yes | No | ○ |
|  | 2.2 | 9.5 | 41.02 | Yes | No | ○ |
|  | 2.2 | 10 | 45.45 | Yes | No | ○ |
|  | 2.2 | 10.5 | 50.11 | Yes | No | ○ |
|  | 2.2 | 11 | 55.00 |  |  | X |

It can be seen from Tables 6 to 8 that when the ground electrode main body part has the thermal conductivity of 18 W/(m·K) or lower and the shape satisfying the condition of $29 \leq L^2/S \leq 49$, the heat dissipation is good and the hollow is effectively suppressed at the melted portion.

Experiment-7

Ni alloys having the cores made of copper wires of different thickness occupying 8%, 10% or 14% the cross sectional area (S) of the ground electrode main body part were prepared to manufacture the ground electrode main body parts having the shape same as that of Experiment-6. The joined body having joined the pedestal of comparative example 1 or example 10 and the noble metal tip made of Pt-10 Rh was joined to each ground electrode main body part to manufacture the ground electrodes. The spark plugs having each ground electrode were subject to the above-described actual machine assessment. Results thereof are shown in Tables 9 to 11 in which the determination criteria are same as those of Experiment-6.

TABLE 9

Ratio of copper in alloy 14%

| S | L | L^2/S | Comparative Article | Present invention | Determination |
|---|---|---|---|---|---|
| 4.2 | 11 | 28.81 | No | No | — |
| 4.2 | 11.5 | 31.49 | No | No | — |
| 4.2 | 12 | 34.29 | No | No | — |
| 4.2 | 12.2 | 35.44 | Yes | No | ○ |
| 4.2 | 12.5 | 37.20 | Yes | No | ○ |
| 4.2 | 13 | 40.24 | Yes | No | ○ |
| 4.2 | 13.5 | 43.39 | Yes | No | ○ |
| 4.2 | 14 | 46.67 | Yes | No | ○ |
| 4.2 | 14.5 | 50.06 | Yes | No | ○ |
| 4.2 | 15 | 53.57 | Yes | No | ○ |
| 4.2 | 15.5 | 57.20 | Yes | No | ○ |
| 4.2 | 16 | 60.95 | Yes | No | ○ |
| 4.2 | 16.5 | 64.82 | Yes | No | ○ |
| 4.2 | 17 | 68.81 | Yes | No | ○ |
| 4.2 | 17.2 | 70.44 | Yes | No | ○ |
| 4.2 | 17.5 | 72.92 | Pre-ignition | Pre-ignition | X |
| 4.2 | 18 | 77.14 | Pre-ignition | Pre-ignition | X |
| 3.5 | 10.5 | 31.50 | No | No | — |
| 3.5 | 10.8 | 33.33 | No | No | — |
| 3.5 | 11 | 34.57 | Yes | No | ○ |
| 3.5 | 11.5 | 37.79 | Yes | No | ○ |
| 3.5 | 12 | 41.14 | Yes | No | ○ |
| 3.5 | 12.5 | 44.64 | Yes | No | ○ |
| 3.5 | 13 | 48.29 | Yes | No | ○ |
| 3.5 | 13.5 | 52.07 | Yes | No | ○ |
| 3.5 | 14 | 56.00 | Yes | No | ○ |
| 3.5 | 14.5 | 60.07 | Yes | No | ○ |
| 3.5 | 15 | 64.29 | Yes | No | ○ |
| 3.5 | 15.5 | 68.64 | Yes | No | ○ |
| 3.5 | 15.8 | 71.33 | Pre-ignition | Pre-ignition | X |
| 3.5 | 16 | 73.14 | Pre-ignition | Pre-ignition | X |
| 3.5 | 16.5 | 77.79 | Pre-ignition | Pre-ignition | X |
| 2.4 | 9 | 33.75 | No | No | — |
| 2.4 | 9.2 | 35.27 | Yes | No | ○ |
| 2.4 | 9.5 | 37.60 | Yes | No | ○ |
| 2.4 | 10 | 41.67 | Yes | No | ○ |
| 2.4 | 10.5 | 45.94 | Yes | No | ○ |
| 2.4 | 11 | 50.42 | Yes | No | ○ |
| 2.4 | 11.5 | 55.10 | Yes | No | ○ |
| 2.4 | 12 | 60.00 | Yes | No | ○ |
| 2.4 | 12.5 | 65.10 | Yes | No | ○ |
| 2.4 | 13 | 70.42 | Yes | No | ○ |
| 2.4 | 13.2 | 72.60 | Pre-ignition | Pre-ignition | X |
| 2.4 | 13.5 | 75.94 | Pre-ignition | Pre-ignition | X |
| 2.4 | 14 | 81.67 | Pre-ignition | Pre-ignition | X |

TABLE 10

Ratio of copper in alloy 10%

| S | L | L^2/S | Comparative Article | Present invention | Determination |
|---|---|---|---|---|---|
| 4.2 | 11 | 28.81 | No | No | — |
| 4.2 | 11.5 | 31.49 | No | No | — |
| 4.2 | 11.8 | 33.15 | No | No | — |
| 4.2 | 12 | 34.29 | Yes | No | ○ |
| 4.2 | 12.5 | 37.20 | Yes | No | ○ |
| 4.2 | 13 | 40.24 | Yes | No | ○ |
| 4.2 | 13.5 | 43.39 | Yes | No | ○ |
| 4.2 | 14 | 46.67 | Yes | No | ○ |
| 4.2 | 14.5 | 50.06 | Yes | No | ○ |
| 4.2 | 15 | 53.57 | Yes | No | ○ |
| 4.2 | 15.5 | 57.20 | Yes | No | ○ |
| 4.2 | 16 | 60.95 | Yes | No | ○ |
| 4.2 | 16.5 | 64.82 | Yes | No | ○ |
| 4.2 | 17 | 68.81 | Yes | No | ○ |
| 4.2 | 17.1 | 69.62 | Yes | No | ○ |
| 4.2 | 17.5 | 72.92 | Pre-ignition | Pre-ignition | X |
| 4.2 | 18 | 77.14 | Pre-ignition | Pre-ignition | X |
| 3.5 | 10 | 28.57 | No | No | — |
| 3.5 | 10.5 | 31.50 | No | No | — |
| 3.5 | 11 | 34.57 | No | No | — |
| 3.5 | 11.2 | 35.84 | Yes | No | ○ |
| 3.5 | 11.5 | 37.79 | Yes | No | ○ |
| 3.5 | 12 | 41.14 | Yes | No | ○ |
| 3.5 | 12.5 | 44.64 | Yes | No | ○ |
| 3.5 | 13 | 48.29 | Yes | No | ○ |
| 3.5 | 13.5 | 52.07 | Yes | No | ○ |
| 3.5 | 14 | 56.00 | Yes | No | ○ |
| 3.5 | 14.5 | 60.07 | Yes | No | ○ |
| 3.5 | 15 | 64.29 | Yes | No | ○ |
| 3.5 | 15.5 | 68.64 | Yes | No | ○ |
| 3.5 | 15.8 | 71.33 | Yes | Yes | ○ |
| 3.5 | 16 | 73.14 | Pre-ignition | Pre-ignition | X |
| 3.5 | 17 | 82.57 | Pre-ignition | Pre-ignition | X |
| 2.4 | 8.5 | 30.10 | No | No | — |
| 2.4 | 9 | 33.75 | No | No | — |
| 2.4 | 9.1 | 34.50 | Yes | No | ○ |
| 2.4 | 9.5 | 37.60 | Yes | No | ○ |
| 2.4 | 10 | 41.67 | Yes | No | ○ |
| 2.4 | 10.5 | 45.94 | Yes | No | ○ |
| 2.4 | 11 | 50.42 | Yes | No | ○ |
| 2.4 | 11.5 | 55.10 | Yes | No | ○ |
| 2.4 | 12 | 60.00 | Yes | No | ○ |
| 2.4 | 12.5 | 65.10 | Yes | No | ○ |
| 2.4 | 13 | 70.42 | Yes | No | ○ |
| 2.4 | 13.5 | 75.94 | Pre-ignition | Pre-ignition | X |

TABLE 11

Ratio of copper in alloy 8%

| S | L | L^2/S | Comparative Article | Present invention | Determination |
|---|---|---|---|---|---|
| 4.2 | 11 | 28.81 | No | No | — |
| 4.2 | 11.3 | 30.40 | No | No | — |
| 4.2 | 11.5 | 31.49 | Yes | No | ○ |
| 4.2 | 12 | 34.29 | Yes | No | ○ |
| 4.2 | 12.5 | 37.20 | Yes | No | ○ |
| 4.2 | 13 | 40.24 | Yes | No | ○ |
| 4.2 | 13.5 | 43.39 | Yes | No | ○ |
| 4.2 | 14 | 46.67 | Yes | No | ○ |
| 4.2 | 14.5 | 50.06 | Yes | No | ○ |
| 4.2 | 15 | 53.57 | Yes | No | ○ |
| 4.2 | 15.5 | 57.20 | Yes | No | ○ |
| 4.2 | 16 | 60.95 | Yes | No | ○ |
| 4.2 | 16.3 | 63.26 | Pre-ignition | Pre-ignition | X |
| 4.2 | 16.5 | 64.82 | Pre-ignition | Pre-ignition | X |
| 4.2 | 17 | 68.81 | Pre-ignition | Pre-ignition | X |
| 3.5 | 10 | 28.57 | No | No | — |
| 3.5 | 10.5 | 31.50 | No | No | — |
| 3.5 | 10.7 | 32.71 | Yes | No | ○ |
| 3.5 | 11 | 34.57 | Yes | No | ○ |
| 3.5 | 11.5 | 37.79 | Yes | No | ○ |
| 3.5 | 12 | 41.14 | Yes | No | ○ |
| 3.5 | 12.5 | 44.64 | Yes | No | ○ |
| 3.5 | 13 | 48.29 | Yes | No | ○ |
| 3.5 | 13.5 | 52.07 | Yes | No | ○ |
| 3.5 | 14 | 56.00 | Yes | No | ○ |
| 3.5 | 14.5 | 60.07 | Yes | No | ○ |
| 3.5 | 15 | 64.29 | Pre-ignition | Pre-ignition | X |
| 3.5 | 15.5 | 68.64 | Pre-ignition | Pre-ignition | X |
| 3.5 | 16 | 73.14 | Pre-ignition | Pre-ignition | X |
| 2.4 | 8 | 26.67 | No | No | — |
| 2.4 | 8.3 | 28.70 | No | No | — |
| 2.4 | 8.5 | 30.10 | Yes | No | ○ |
| 2.4 | 9 | 33.75 | Yes | No | ○ |
| 2.4 | 9.5 | 37.60 | Yes | No | ○ |
| 2.4 | 10 | 41.67 | Yes | No | ○ |
| 2.4 | 10.5 | 45.94 | Yes | No | ○ |
| 2.4 | 11 | 50.42 | Yes | No | ○ |
| 2.4 | 11.3 | 53.20 | Yes | No | ○ |

TABLE 11-continued

Ratio of copper in alloy 8%

| S | L | L^2/S | Comparative Article | Present invention | Determination |
|---|---|---|---|---|---|
| 2.4 | 11.5 | 55.10 | Pre-ignition | Pre-ignition | X |
| 2.4 | 12 | 60.00 | Pre-ignition | Pre-ignition | X |
| 2.4 | 12.5 | 65.10 | Pre-ignition | Pre-ignition | X |

It can be seen from Tables 9 to 11 that when 10% or more of the cross sectional area (S) of the ground electrode main body part is made of the copper wire and has the shape of satisfying a condition of $35 \leq L^2/S \leq 70$, the heat dissipation is good and the hollow is further effectively suppressed in the melted portion. In addition, the core is provided, so that the heat dissipation of the entire ground electrode is also improved.

While the invention has been described with reference to examples thereof, the invention is not limited to these examples. It will be understood by those of ordinary skill in the art that various changes in form and details may be made therein within the invention.

This application claims the priority of Japanese Patent Application No. 2008-230540 filed on Sep. 9, 2008, the disclosures of which are incorporated herein by reference.

[Descriptions of reference numerals]

| 11: | metal shell |
|---|---|
| 12: | insulator |
| 13: | center electrode |
| 14: | ground electrode |
| 14A: | ground electrode main body part |
| 22: | noble metal tip |
| 23: | pedestal |
| 100: | spark plug |

The invention claimed is:

1. A spark plug comprising:
a cylindrical metal shell;
a cylindrical insulator held by the metal shell;
a center electrode held in the insulator; and
a ground electrode that includes a ground electrode main body part having one end fixedly connected to the metal shell and the other end facing the center electrode, and a noble metal tip joined to the ground electrode main body part at a position facing a leading end of the center electrode, a spark discharge gap being formed between the leading end of the center electrode and the noble metal tip,
wherein at least a portion of the ground electrode main body part, to which the noble metal tip is joined, is made of an alloy containing 12 to 45 mass % of Cr, 7 mass % or less of Fe, more than 0.5 mass % to 5 mass % or less of Al, more than 0.3 to 5 mass % or less of Si and Ni with 50 mass % or more of the rest of the contents, and wherein the joined portion and the noble metal tip are joined by laser welding or electron beam welding.

2. The spark plug according to claim 1, wherein the content of Al is 0.7 mass % or more and the content of Si is 0.7 mass % or more.

3. The spark plug according to claim 1, wherein the alloy constituting the joined portion includes at least one of Y, Hf, Zr, La, Ce and Nd by 0.01 to 0.4 mass %.

4. The spark plug according to claim 1, wherein the alloy constituting the joined portion includes 0.005 to 5 mass % of Mn.

5. The spark plug according to claim 1, wherein the noble metal tip is made of Pt alloy.

6. The spark plug according to claim 5, wherein the Pt alloy includes at least one of Ir, Rh, Ru and Ni.

7. The spark plug according to claim 5, wherein a melted portion in which the joined portion and the noble metal tip are melted each other includes 3 mass % or less of Fe, 10 to 60 mass % of Ni, 15 to 75 mass % of Pt, 4 to 35 mass % of Cr, 0.03 to 2 mass % of Al and 0.03 to 2 mass % of Si.

8. The spark plug according to claim 7, wherein the melted portion includes 0.1 mass % or more of Al and 0.1 mass % or more of Si.

9. The spark plug according to claim 7, wherein the melted portion includes at least one of Y, Hf, Zr, La, Ce and Nd by 0.001 to 0.2 mass %.

10. The spark plug according to claim 7, wherein the melted portion includes 0.0025 to 3 mass % of Mn.

11. The spark plug according to claim 1, wherein where a longitudinal length of the ground electrode main body part from the joined end of the ground electrode main body part with the metal shell to the joined position of the noble metal tip is L and a cross sectional area of the ground electrode main body part perpendicular to the longitudinal direction is S, a relation of $29 \leq L^2/S \leq 49$ is satisfied and a thermal conductivity of the ground electrode main body part is 18 W/(m·K) or less at room temperatures.

12. The spark plug according to claim 1, wherein where a longitudinal length of the ground electrode main body part from the joined end of the ground electrode main body part with the metal shell to the joined position of the noble metal tip is L and a cross sectional area of the ground electrode main body part perpendicular to the longitudinal direction is S, 10% or more of the cross sectional area (S) of the ground electrode main body part is made of Cu or Cu alloy and a relation of $35 \leq L^2/S \leq 70$ is satisfied within a range of ½ or more of the longitudinal length (L) of the ground electrode main body part.

13. The spark plug according to claim 1, wherein the ground electrode main body part has a pedestal part that is fixedly connected to a surface thereof at the position facing the leading end of the center electrode, the pedestal part is made of the alloy and the noble metal tip is joined to the pedestal part by the laser welding or electron beam welding.

* * * * *